(12) United States Patent  (10) Patent No.: US 7,754,954 B2
Neil  (45) Date of Patent: Jul. 13, 2010

(54) MUSIC EDUCATION SYSTEM AND METHOD OF USE

(76) Inventor: Linda Ruth Neil, 1667 W. 7th Pl., Mesa, AZ (US) 85201

( * ) Notice: Subject to any disclaimer, the term of this patent is extended or adjusted under 35 U.S.C. 154(b) by 281 days.

(21) Appl. No.: 12/132,564

(22) Filed: Jun. 3, 2008

(65) Prior Publication Data

US 2009/0293704 A1   Dec. 3, 2009

(51) Int. Cl.
  *G09B 15/00* (2006.01)
(52) U.S. Cl. .................................................. 84/470 R
(58) Field of Classification Search ............... 84/470 R, 84/471 R, 478, 479 R, 481, 479 A, 483.1, 84/483.2, 484
  See application file for complete search history.

(56) References Cited

U.S. PATENT DOCUMENTS

| 1,879,002 | A |  | 9/1932 | Alles |
| 2,864,275 | A |  | 12/1958 | Fraleigh |
| 2,977,836 | A |  | 4/1961 | Lang |
| 3,530,758 | A |  | 9/1970 | Stillo |
| 3,654,711 | A |  | 4/1972 | Taylor |
| 4,444,083 | A |  | 4/1984 | Apel et al. |
| 4,464,971 | A |  | 8/1984 | Dean |
| 4,584,223 | A |  | 4/1986 | Krapf |
| 4,832,605 | A |  | 5/1989 | Bragin |
| 5,200,853 | A |  | 4/1993 | Berkman |
| 5,254,008 | A |  | 10/1993 | Dawson |
| 5,811,705 | A | * | 9/1998 | Glenn ........................ 84/477 R |
| 6,468,666 | B2 |  | 10/2002 | Krebs et al. |
| 6,841,724 | B2 | * | 1/2005 | George ....................... 84/477 R |
| 7,119,048 | B2 |  | 10/2006 | Staadecker et al. |
| 2002/0096036 | A1 |  | 7/2002 | Tan |
| 2007/0020444 | A1 |  | 1/2007 | Moore |
| 2007/0099510 | A1 |  | 5/2007 | Beno |

FOREIGN PATENT DOCUMENTS

| DE | 3407295 A1 | 9/1985 |
| EP | 1101603 A1 | 5/2001 |
| GB | 2046980 A | 11/1980 |
| WO | 9415324 A1 | 7/1994 |

* cited by examiner

*Primary Examiner*—Kimberly R Lockett
(74) *Attorney, Agent, or Firm*—Schmeiser Olsen & Watts LLP

(57) ABSTRACT

A Music Education System including at least one staff coupled to at least one markable and erasable piece of material, which attracts magnetic surfaces, comprising at least one magnetic surface; and coupleable to a markerboard; at least one musical notation placed on the at least one staff; and wherein the at least one markable and erasable piece of material can be rolled and comprising at least one keyboard mockup. A method for using a music education system comprising: coupling at least one staff, permanently coupled to at least one markable and erasable piece of material, to a markerboard; placing and removing at least one musical notation on the at least one staff; removing the at least one markable and erasable piece of material; rolling the at least one markable and erasable piece of material; and placing the at least one markable and erasable piece of material in a storage container.

21 Claims, 13 Drawing Sheets

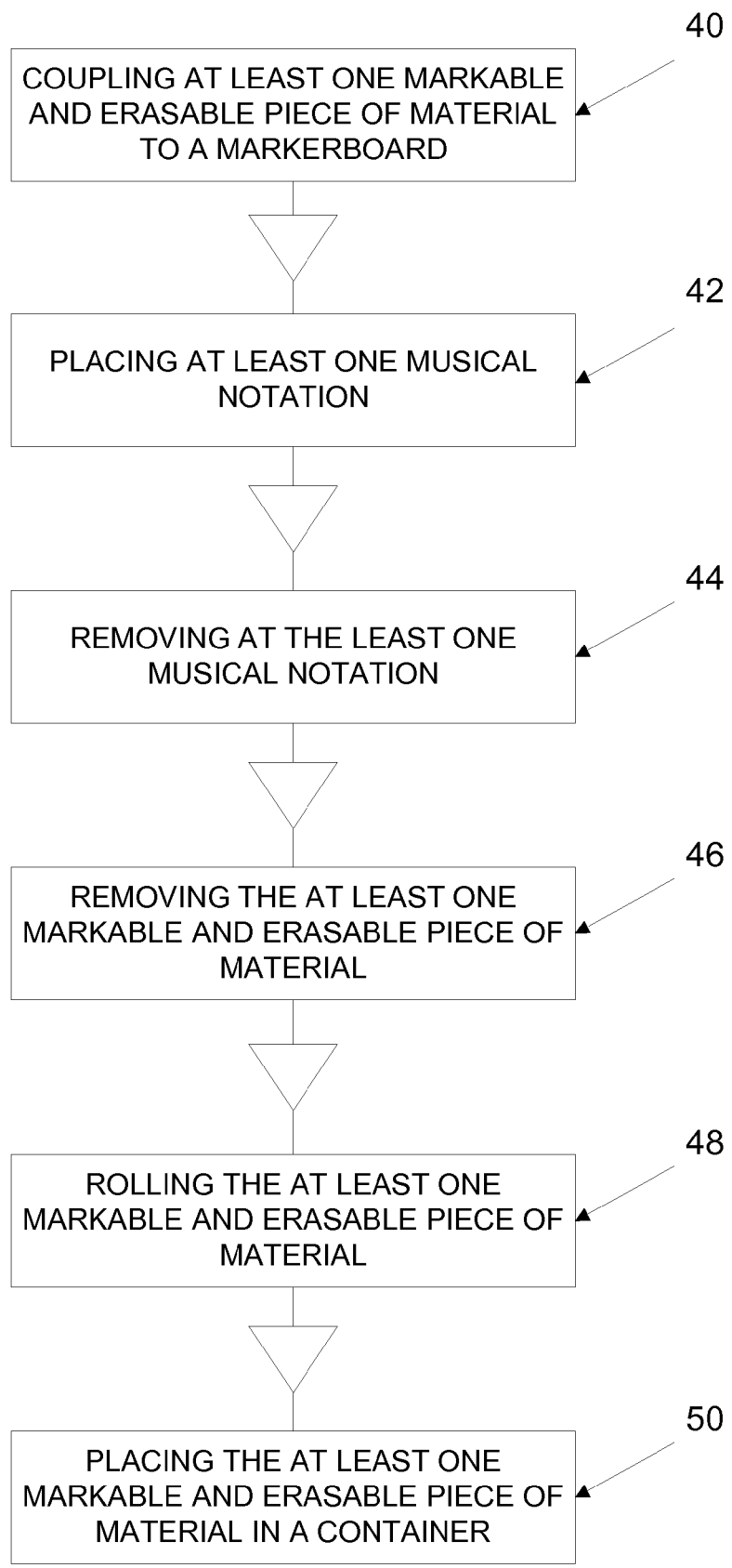

MUSIC EDUCATION SYSTEM AND METHOD OF USE

BACKGROUND OF THE INVENTION

1. Technical Field

This invention relates to a music education system and a method of using said system.

2. Background Art

Since the development of musical instruments, teachers have been trying to develop new and unique ways to teach and motivate music students. Patents have issued on many different types of music education systems.

For example, U.S. Pat. No. 6,841,724, issued to George, describes a method and system of teaching and/or studying music theory and for aiding the practice of musical instruments according to the integration of the color spectrum with notes of the circle of fifths and rearrangement of those notes into the musical chromatic scale.

U.S. Pat. No. 3,530,758, issued to Stillo, describes an educational device for teaching music to the blind including a sheet of magnetized material having raised portions disposed thereon which are positioned so as to represent a musical staff for receiving discrete musical characters which can be detachably secured to the sheet and touched by the blind student during his instruction.

Finally, U.S. Pat. No. 5,811,705, issued to Glenn, describes a learning apparatus for learning notes including a planar, one-part or multi-part board, made of wood, cardboard, plastic, or a similar, nearly form-rigid material with a working surface, exhibiting non-removable and well-recognizable staff indicia means. The work surface is inscribable or imprintable and covered with an adhering felt layer or magnetic foil or with a foil furnished with comparable adhering means, wherein light form-parts, which are easily removable by hand, are placeable on the foil. The form-parts are shaped like all musical notation indicia and musical clef indicia used for writing down notes and are furnished at their backs with hook-and-loop adhering means or magnetic adhering means or the like adhering means.

With all of these different music education systems, though, there are still areas where improvement is needed. Particularly in teaching music in a school environment where there are multiple students all being taught at one time. Accordingly, there is a need for improvements in music education systems that make learning music fun in all environments, but especially in a classroom environment.

DISCLOSURE OF THE INVENTION

The music education system and method of using said system of this invention has several features, no single one of which is solely responsible for its desirable attributes. Without limiting the scope of this invention as expressed by the claims that follow, its more prominent features will now be discussed briefly. The present invention provides a music education system comprising: at least one staff, wherein the at least one staff is permanently coupled to at least one markable and erasable piece of material; wherein the at least one markable and erasable piece of material attracts magnetic surfaces where the at least one staff is coupled; wherein the at least one markable and erasable piece of material comprises at least one magnetic surface opposite a surface to which the at least one staff is coupled; wherein the at least one markable and erasable piece of material is removably coupleable to a markerboard by the at least one magnetic surface; at least one musical notation comprising at least one magnetic surface; wherein the at least one musical notation is removably coupleable to the at least one staff; and wherein the at least one markable and erasable piece of material can be rolled to allow the music education system to be stored compactly.

An alternate embodiment of a music education system configured according to the present invention comprises: at least one staff permanently coupled to at least one markable and erasable piece of material; wherein the at least one markable and erasable piece of material comprises at least one magnetic surface; wherein the at least one markable and erasable piece of material is removably coupleable to a markerboard by the at least one magnetic surface; at least one musical notation placed on the at least one staff; and at least one keyboard mockup.

A method for using a music education system configured according to an embodiment of the present invention comprises: coupling at least one markable and erasable piece of material to a markerboard, wherein at least one staff is permanently coupled to the at least one markable and erasable piece of material; placing at least one musical notation on the at least one staff; removing the at least one musical notation from the at least one staff; removing the at least one markable and erasable piece of material from the markerboard; rolling the at least one markable and erasable piece of material; and placing the at least one markable and erasable piece of material in a storage container.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and:

FIG. 12 is a flow chart of a method of using a music education system configured according to an embodiment of the present invention.

DESCRIPTION OF THE PREFERRED EMBODIMENTS

As discussed above, embodiments of the present invention relate to a music education system and method of use for said music education system. The music education system of the present invention is designed for use by a teacher in order to aid understanding of a student. The music education system of the present invention may comprise, at least one markable and erasable piece of material, at least one musical notation and at least one keyboard mockup.

Figure 1:
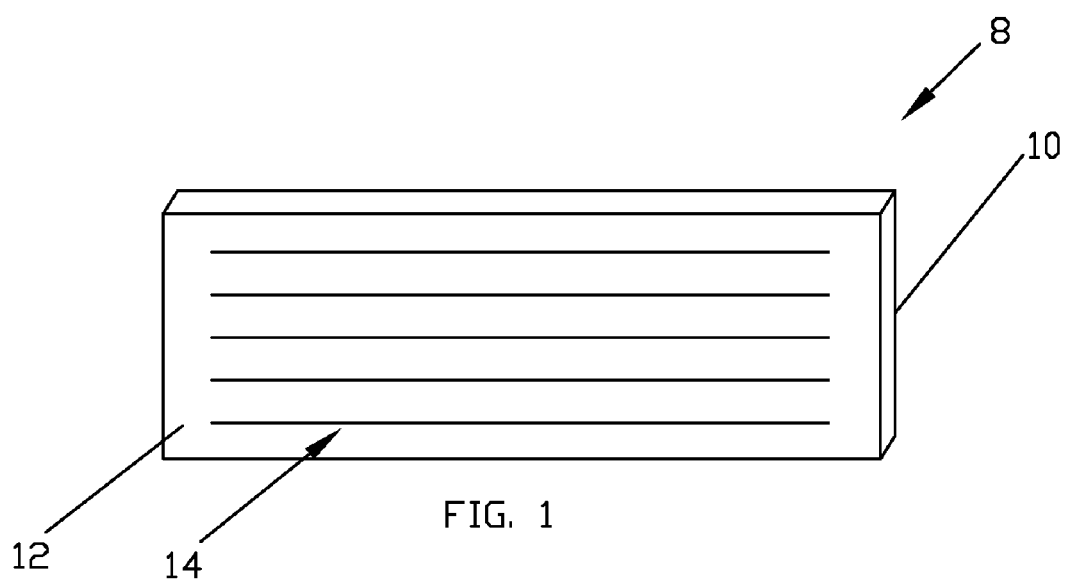
FIG. 1 is a perspective view of at least one markable and erasable piece of material configured according to a first embodiment of the present invention.

FIG. 1 depicts at least one markable and erasable piece of material 8 configured according to an embodiment of the present invention. The at least one markable and erasable piece of material 8 comprises at least one surface 12 that can be marked with an eraser board marker or the like and then erased. The at least one surface 12 in alternate embodiments of the present invention also attracts magnetic surfaces in order to allow magnets to be coupled to the at least one surface 12.

Figure 7:
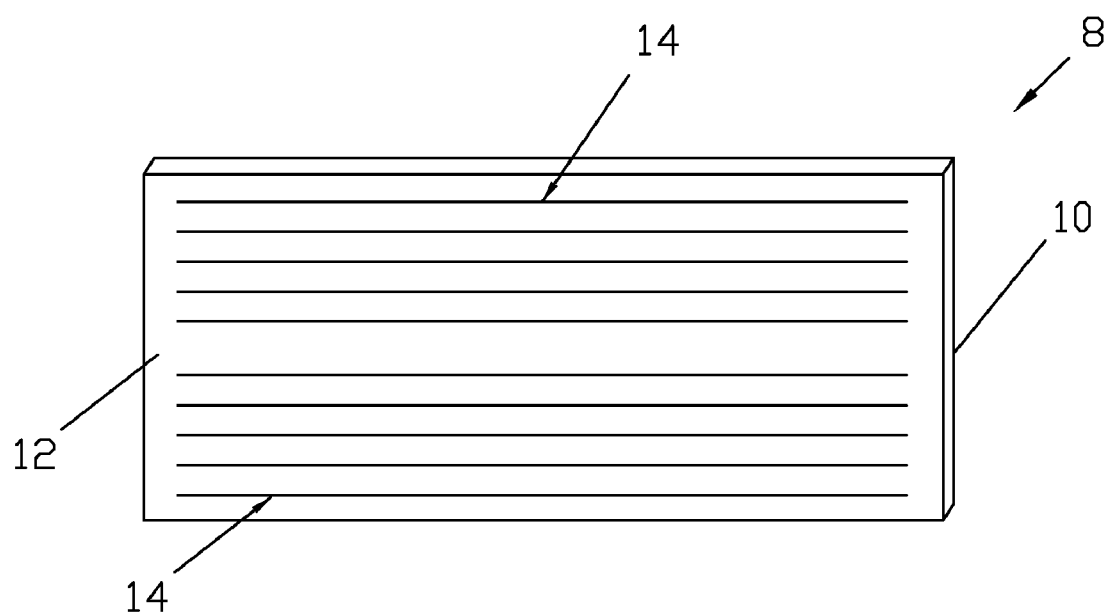
FIG. 7 is a perspective view of at least one markable and erasable piece of material configured according to a second embodiment of the present invention.

Permanently coupled or printed on the at least one surface 12 is at least one staff 14. The at least one staff 14 is a musical staff on which musical compositions and the like may be placed. The at least one staff 14 comprises a grouping of lines and spaces upon which at least one musical notation is placed. The at least one staff 14 may be printed or permanently coupled to the at least one surface 12 in any way that attaches the at least one staff 14 to the at least one surface 12. For example, the at least one staff 14 may be printed by a printer on the at least one surface 12. The at least one staff 14 may also be formed from another material such as felt or fabric and may be permanently attached to the at least one surface 12 with some form of adhesive or the like. The at least one staff 14 may preferably allow magnetic surfaces to be attracted to the at least one surface 12 of the at least one erasable and markable piece of material 8 through it. The at least one surface 12 may only attract magnetic surfaces in the area of the at least one surface 12 to which the at least one staff 14 is coupled. The at least one staff 14 may also be any color desired. However, the at least one staff 14 should be a color that contrasts with the at least one surface 12 enough to allow the at least one staff 14 to be seen clearly across a class room or the like. In particular embodiments of the present invention, the at least one staff 14 will also be markable and erasable and should be coupled to the at least one markable and erasable piece of material 8 on the at least one surface 12 that is also markable and erasable. It may also be desirable for the at least one staff 14 to attract magnetic surfaces. FIG. 1 illustrates the at least one markable and erasable piece of material 8 with at least one staff 14 coupled to it. FIG. 7 illustrates an alternate embodiment of the present invention in which the at least one markable an erasable piece of material 8 has two at least one staffs 14 coupled to the at least one surface 12. Two staffs 14 may be desirable in order to show multiple clefs as often used in piano compositions.

Figure 8:
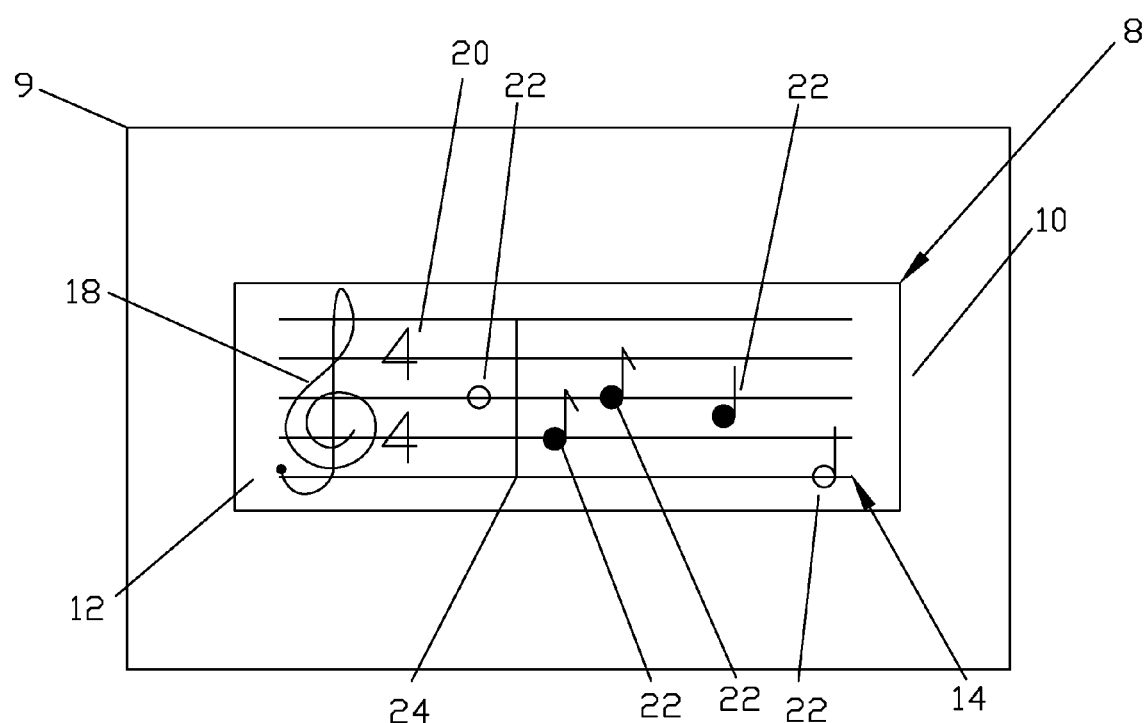
FIG. 8 is a front view of at least one markable and erasable piece of material configured according to an embodiment of the present invention coupled to at least one markerboard.

The at least one markable and erasable piece of material 8 also has at least one magnetic surface 10 on the side of the at least one markable and erasable piece of material 8 that is opposite to the at least one staff 14. The at least one magnetic surface 10 may be formed of any material that has magnetic properties. The at least on magnetic surface 10 may be attached to the at least one markable and erasable piece of material 8 or else it may be formed as an integral part of the at least one markable and erasable piece of material 8. The at least one magnetic surface 10 may also cover an entire side or surface of the at least one markable and erasable piece of material 8 or it may cover only small sections. The at least one magnetic surface 10 allows the at least one markable and erasable piece of material 8 to be removably coupled to any surface that attracts magnets. It is envisioned that the at least one markable and erasable piece of material 8 will primarily be removably coupled to classroom markerboards 9 (see FIG. 8). However, for this patent application, markerboard 9 refers to any markerboard, chalkboard or other board or surface that attracts magnets.

In using the at least one markable and erasable piece of material 8 to teach music, the at least one markable and erasable piece of material 8 may be coupled to a markerboard 9. The at least one staff 14 will be visible when the at least one markable and erasable piece of material 8 is coupled to a markerboard 9.

Figure 2:
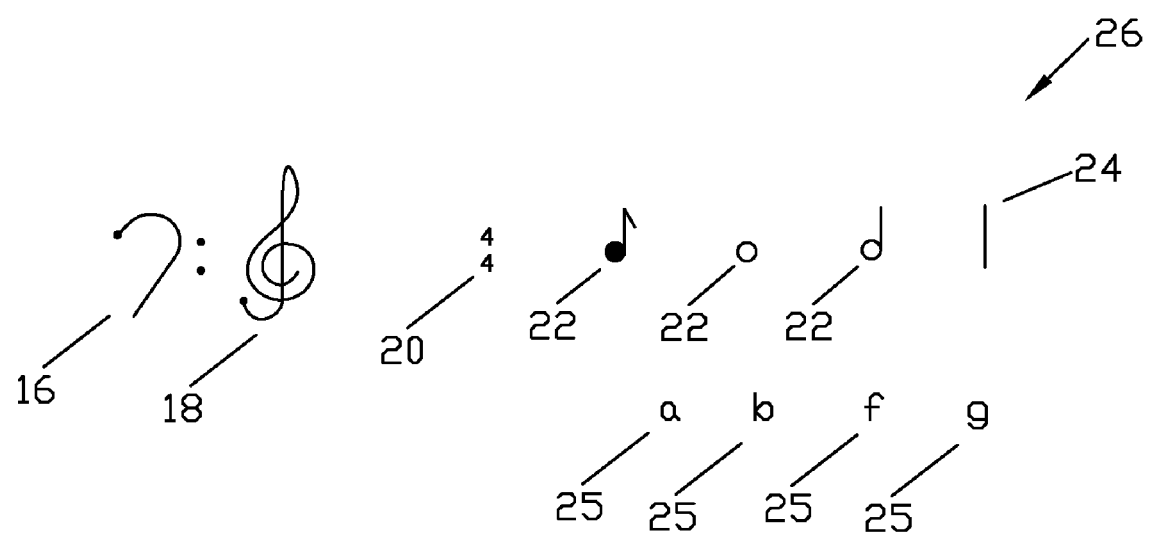
FIG. 2 is a front view of at least one musical notation configured according to an embodiment of the present invention.
Figure 3:
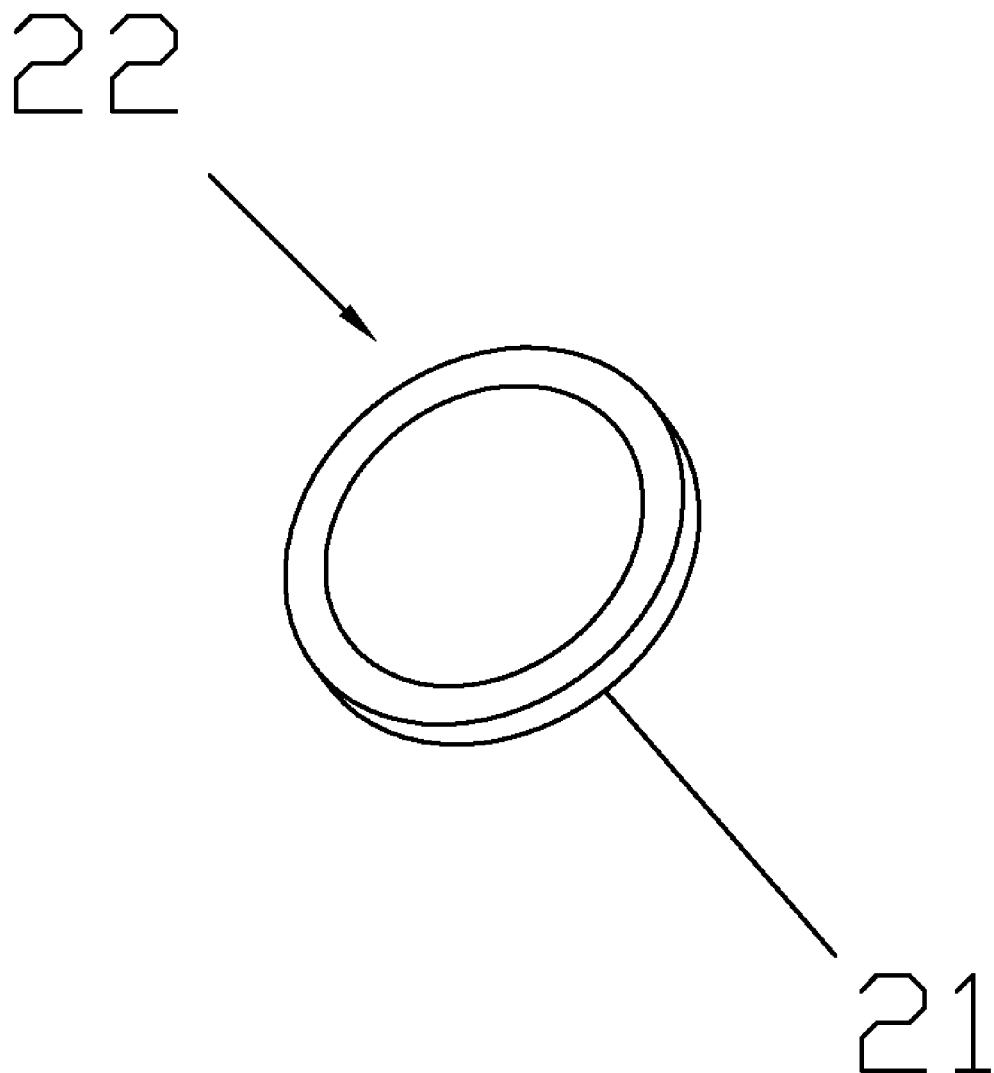
FIG. 3 is a perspective view of at least one musical notation configured according to an embodiment of the present invention.

At least one musical notation 26 (see FIG. 2) may then be placed on the at least one staff 14. The at least one musical notation 26 may comprise any system which represents aurally perceived music through the use of written symbols. Examples of the at least one musical notation include: clef markings 16 and 18, rests, notes 22, key signatures, time signatures 20, measures 24, letters 25 (specifically a-g as used to identify keys on the piano) and the like. In embodiments of the present invention, the at least one musical notation 26 may be formed from magnetic material or have at least one magnetic surface 21 (see FIG. 3) in order to allow the at least one musical notation 26 to be removably coupled to the at least one staff 14. The at least one musical notation 26 may be formed with a die-cut machine. The at least one musical notation 26 may be coupled to the at least one staff 14 and may then be removed and then coupled to the at least one staff 14 again, at the same or a different location.

The at least one musical notation 26 may also simply be drawn on the at least one staff 14 using a markerboard marker or the like. The at least one musical notation 26 may then be erased from the at least one staff 14 and redrawn anywhere on the at least one staff 14. Therefore, when this application refers to "placing" at least one musical notation 26 on the at least one staff 14, the at least one musical notation 26 may be placed on the at least one staff 14 using at least one magnetic surface or it may be drawn on the at least one staff 14 or the like.

Figure 4:
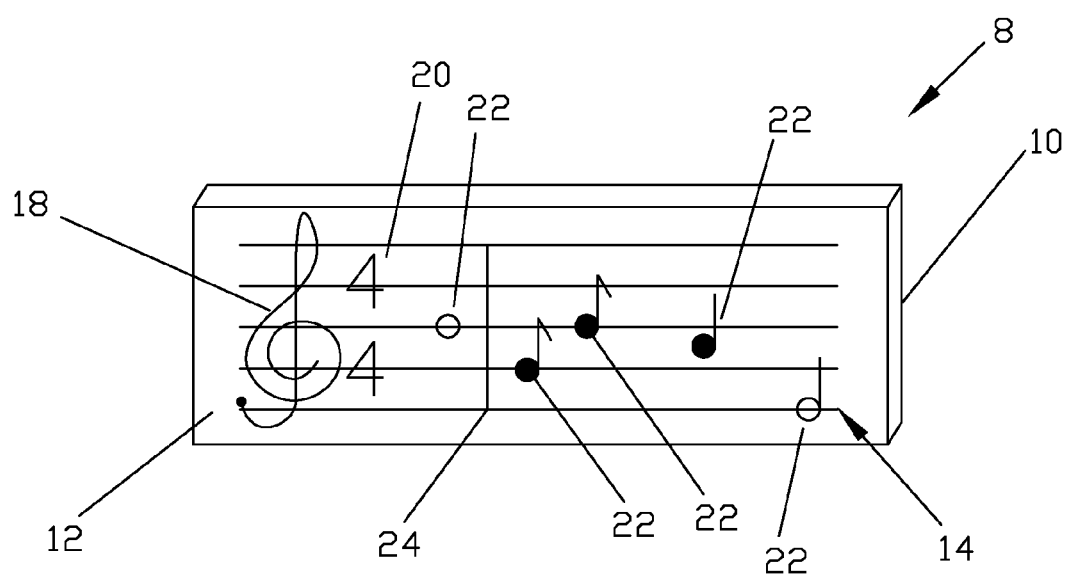
FIG. 4 is a perspective view of at least one markable and erasable piece of material and at least one musical notation configured according to a first embodiment of the present invention.

FIG. 4 illustrates an embodiment of the at least one markable and erasable piece of material 8 with at least one musical notation 18, 20, 22 and 24 placed on the at least one staff 14. As illustrated in FIG. 4, the at least one musical notation placed on the at least one staff 14 will often comprise at least one clef notation 18.

Figure 5:
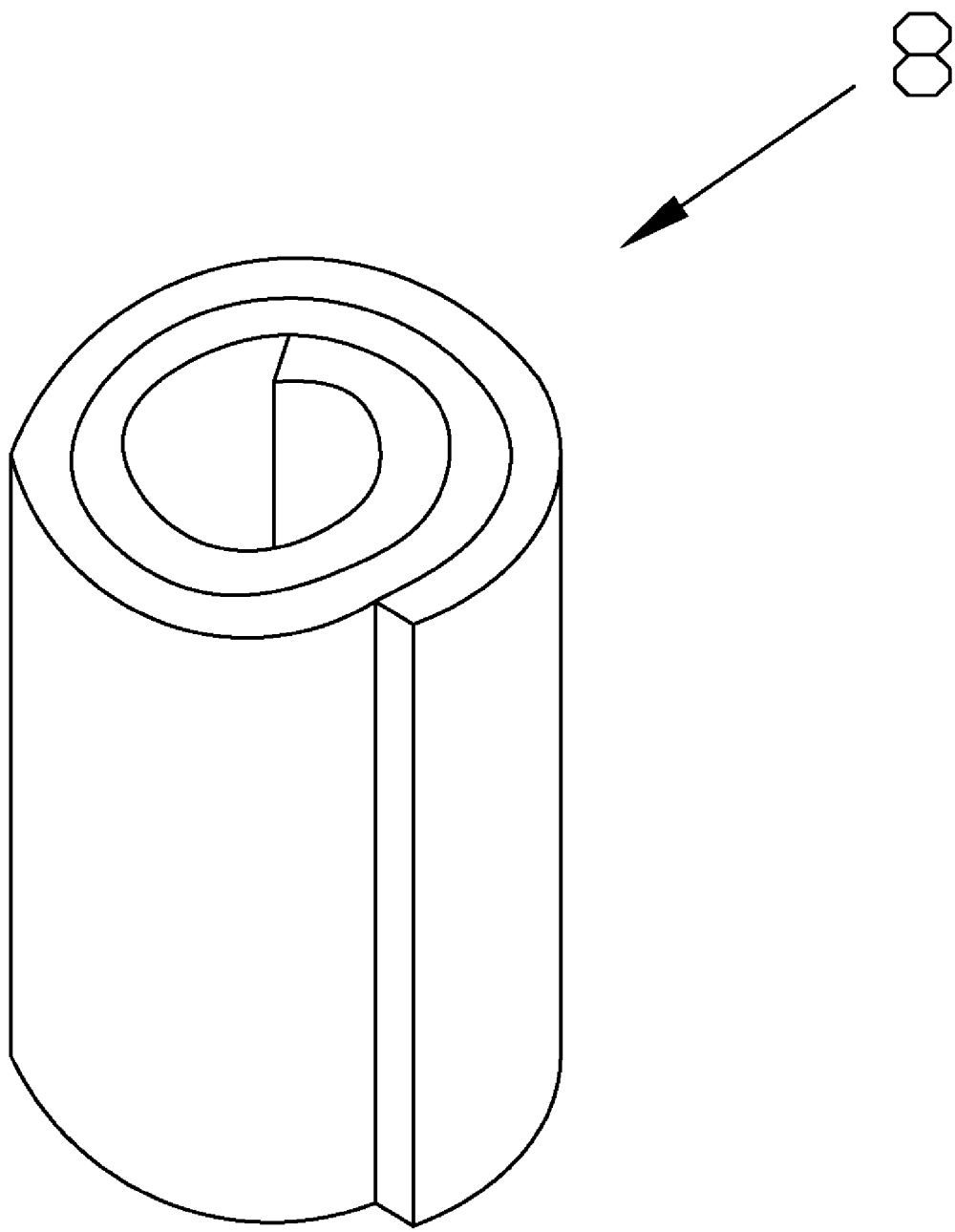
FIG. 5 is a perspective view of a rolled at least one markable and erasable piece of material configured according to an embodiment of the present invention.
Figure 6:
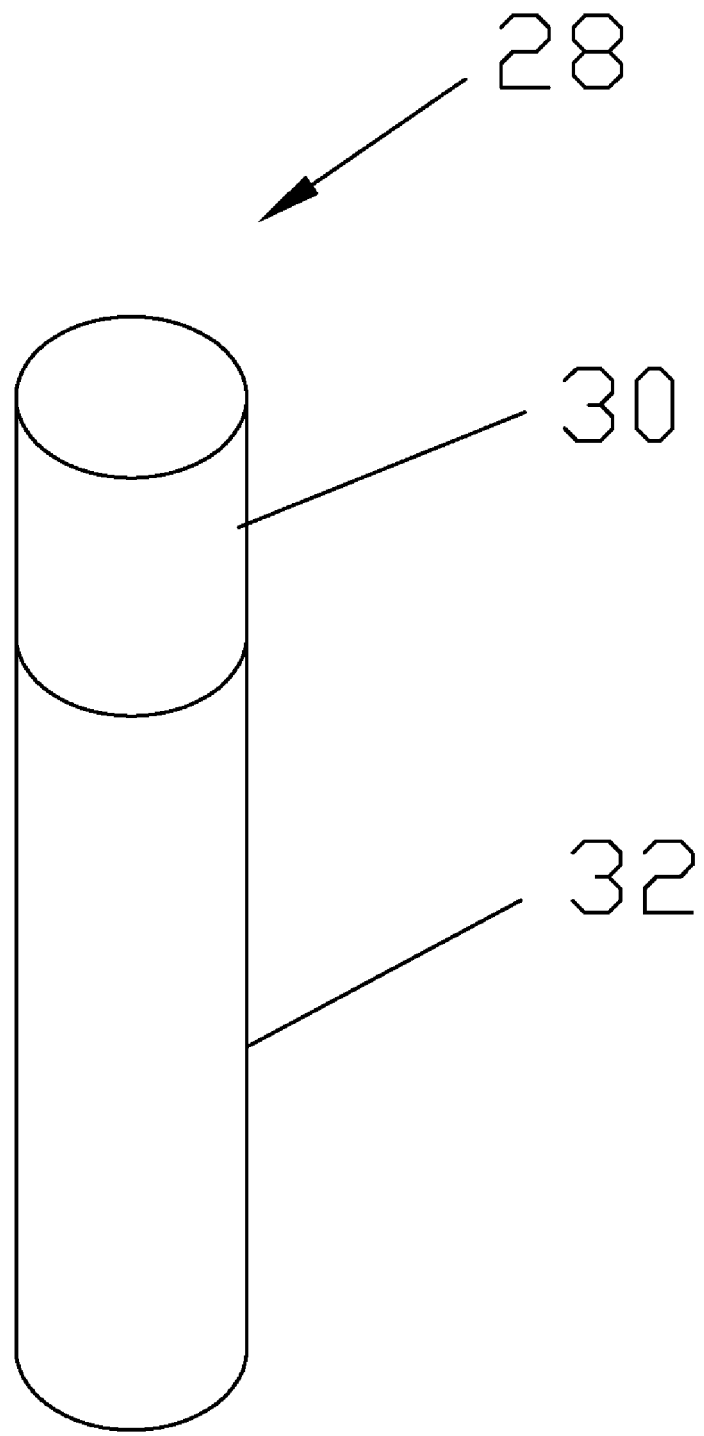
FIG. 6 is a perspective view of a tube configured according to an embodiment of the present invention.

As seen in FIG. 5, the at least one markable and erasable piece of material 8, the at least one staff, the at least one magnetic surface and the at least one surface in embodiments of the present invention may all be formed from a flexible material that allows the at least one markable and erasable piece of material 8 to be rolled in order for it to be stored compactly in a container such as that shown in FIG. 6. The at least one musical notation may also be formed from flexible material and may be stored on the at least one markable and erasable piece of material 8 or in position on the at least one staff. Alternately, the at least one musical notation may be formed from a stiffer material and may be removed from the at least one markable and erasable piece of material 8 prior to storage.

FIG. 6 illustrates a possible storage container 28 for use in conjunction with the music education system. In this example, the storage container 28 comprises a tube such as that used to store posters, architectural drawings and the like. The tube has two parts, a lid 30 and a body 32.

Figure 9:
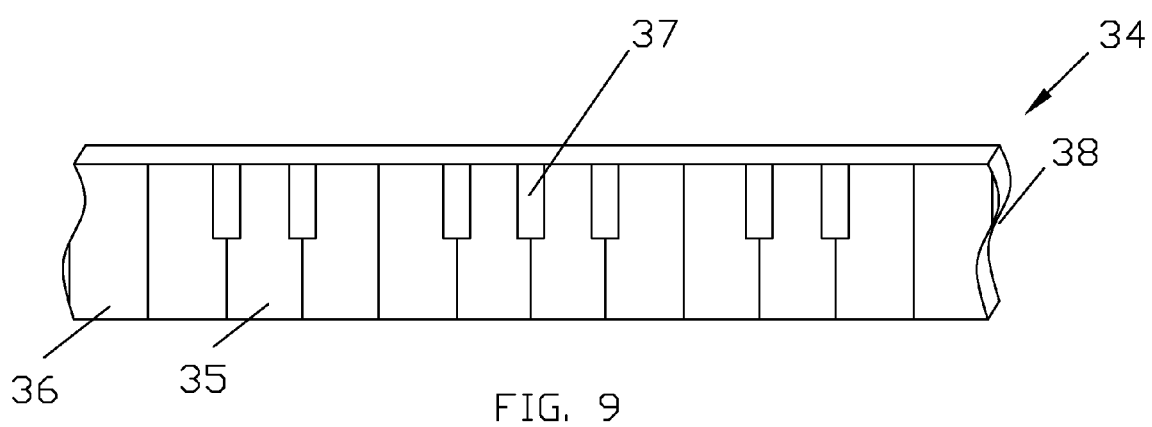
FIG. 9 is a partial perspective view of at least one keyboard mockup configured according to an embodiment of the present invention.
Figure 11A:
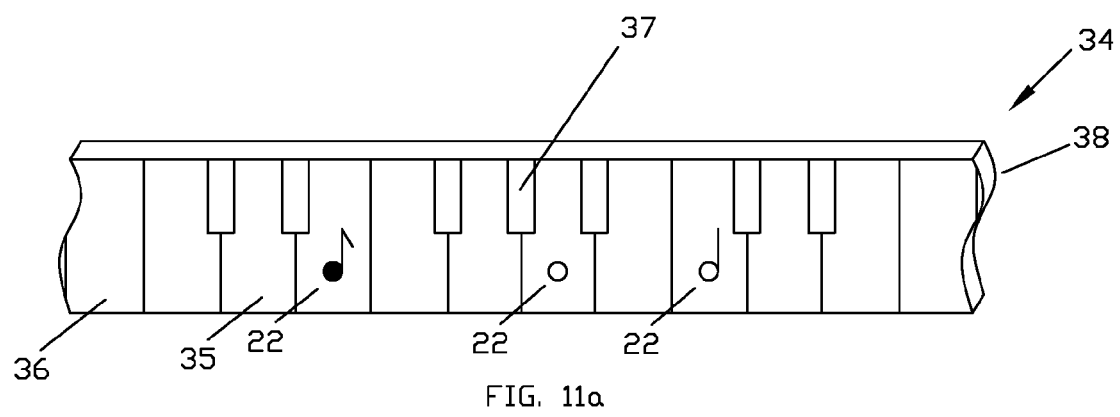
FIG. 11a is a partial perspective view of at least one keyboard mockup and at least one musical notation configured according to an embodiment of the present invention.
Figure 11B:
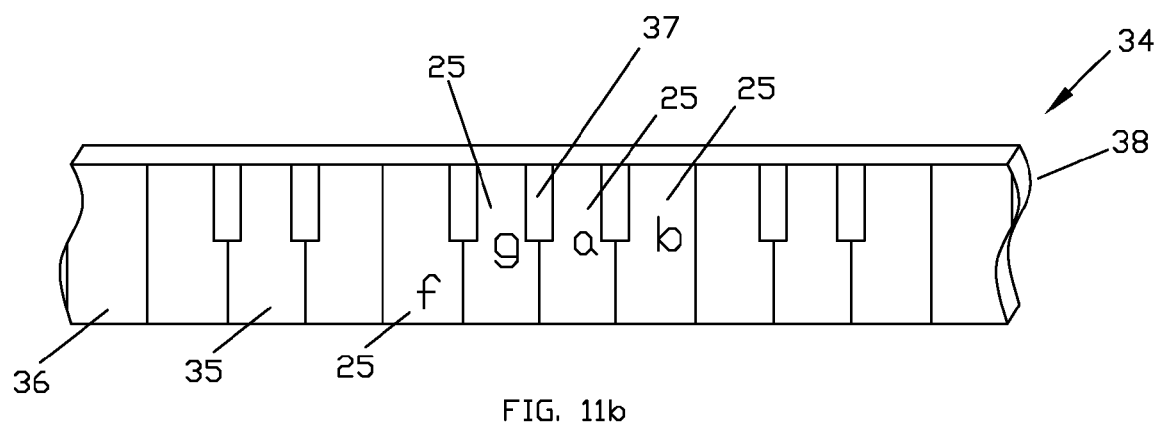
FIG. 11b is a partial perspective view of at least one keyboard mockup and at least one musical notation configured according to an alternate embodiment of the present invention.

At least one keyboard mockup 34 as illustrated in FIG. 9 may also be used in association with the at least one markable and erasable piece of material 8. The at least one keyboard mockup 34 is simply a piece of material with an image of a keyboard 37 coupled to one surface of the material. The at least one keyboard mockup 34 shows the location of the different keys 35 as seen on a real keyboard such as that of a piano. The at least one keyboard mockup 34 may be used in situations where there are not enough actual keyboards for all of the students. The at least one keyboard mockup 34 may also be used as a change from an actual keyboard in order to keep a student's attention. The at least one keyboard mockup 34 may be formed on any material desirable such as felt or markerboard material or the like. The at least one keyboard mockup 34 may also be formed from the same material as the at least one markable and erasable piece of material. It may even be desirable for the at least one keyboard mockup 34 to have at least one surface 36 that attracts magnets and is erasable and markable. This allows a teacher or a student to place the at least one musical notation on the at least one keyboard mockup 34 in order to correlate the position of a note on the at least one keyboard mockup 34 with the position of a note on the at least one staff. The at least one musical notation may be drawn or placed on the at least one keyboard mockup 34 as shown in FIGS. 11a and 11b. FIG. 11b specifically shows the keys 35 on the keyboard mockup 34 being identified by a letter 25 which is also a musical notation as defined in this application.

It may also be desirable for the at least one keyboard mockup 34 (see FIG. 9) to have at least one magnetic surface 38 similar to the at least one magnetic surface of the at least one markable and erasable piece of material. This would allow the at least one keyboard mockup 34 to be removably coupled to a markerboard or the like. The at least one magnetic surface 38 would be coupled to a surface opposite to the at least one surface 36 to which the image of a keyboard is coupled. This allows the keyboard image 37 to be seen when the at least one keyboard mockup 34 is coupled to a markerboard.

The image of a keyboard 37 may be permanently coupled to the at least one surface 36 of the at least one keyboard mockup 34. The image of a keyboard 37 may be printed on the at least one keyboard mockup 34 or it may be formed from another material and coupled to the at least one keyboard mockup 34 using an adhesive. It is desirable, however, for the image of a keyboard 37 to be markable and erasable.

Figure 10:
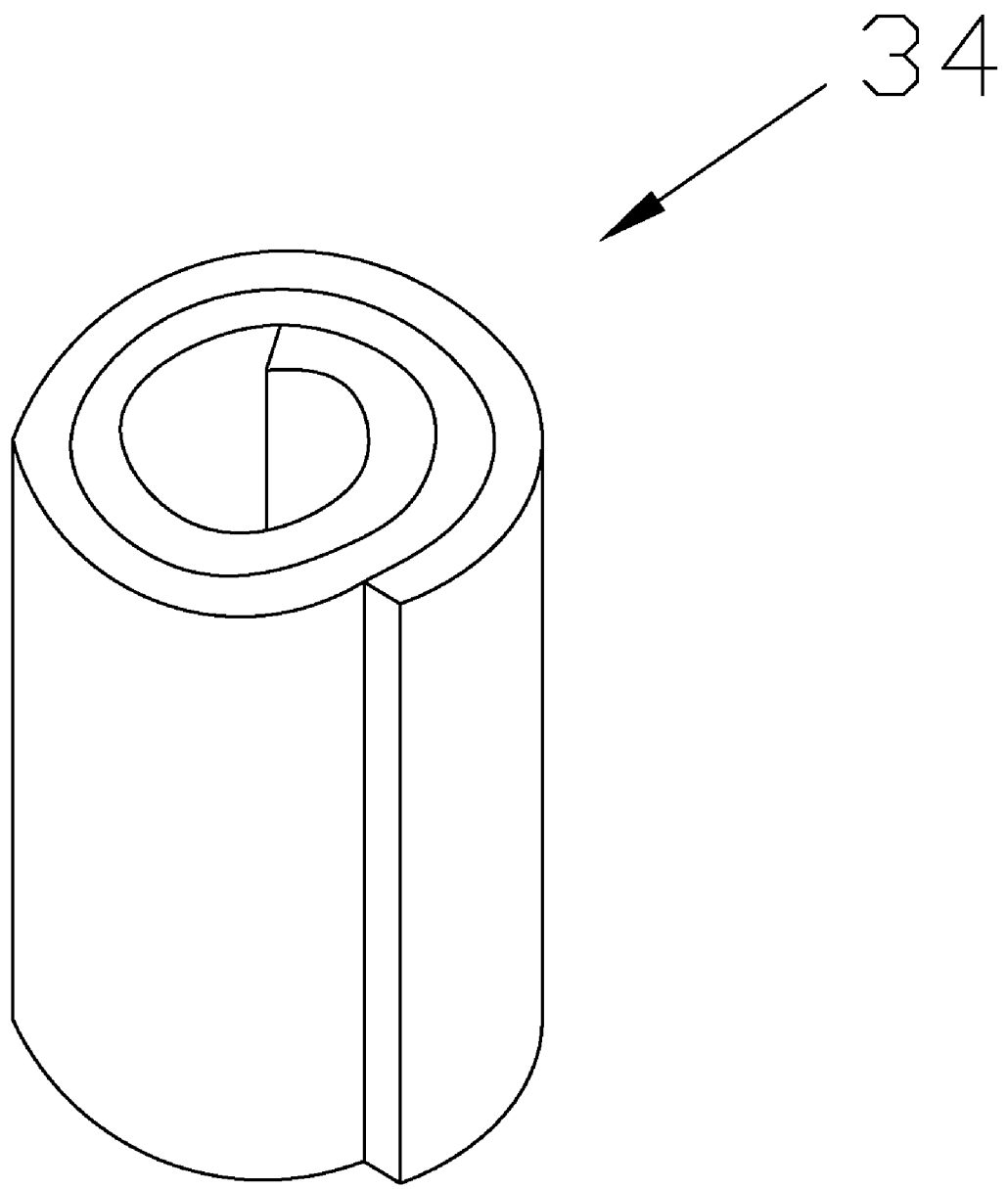
FIG. 10 is a perspective view of a rolled at least one keyboard mockup configured according to an embodiment of the present invention.

In embodiments of the present invention, the at least one keyboard mockup 34 may be formed from a flexible material that would allow the at least one keyboard mockup 34 to be rolled as shown in FIG. 10 in order to allow the at least one keyboard mockup 34 to be stored compactly such as in the tube of FIG. 6. The at least one keyboard mockup 34 may be stored in the tube of FIG. 6 along with the at least one markable and erasable piece of material. The at least one musical notation may also be stored in the same container in order to allow easy storage of the entire music education system.

FIG. 12 illustrates a method of using a music education system configured according to an embodiment of the present invention. First, in using the music education system the at least one markable and erasable piece of material is coupled to a markerboard 40 by placing the at least one magnetic surface against the markerboard. It is also possible, however, to simply lay the at least one markable and erasable piece of material on the floor or prop it up against something in order to use it. Then at least one musical notation is placed 42 on the at least one markable and erasable piece of material or more specifically, the at least one musical notation is placed 42 on the at least one staff which is permanently coupled to the at least one markable and erasable piece of material. The at least one musical notation may be placed 42 on the at least one markable and erasable piece of material by coupling the at least one magnetic surface of the at least one musical notation on the at least on markable and erasable piece of material, or else the at least one musical notation may simply be drawn on the at least on markable and erasable piece of material.

In variations on the method of using the music education system, the at least one musical notation may be placed or the student may pretend to play or identify the at least one musical notation on at least one keyboard mockup. In particular, the student may place a letter as the at least one musical notation on the at least one keyboard mockup. The student then has to find the location of the note identified on the at least one keyboard mockup on the at least one markable and erasable piece of material or more particularly on the at least one staff. The at least one musical notation may also be placed on the at least one markable and erasable piece of material and the student then has to identify or pretend to play the at least one musical notation on the at least one keyboard mockup. The student may use a letter as the at least one musical notation placed on the at least one markable and erasable piece of material in this variation. The student may also be required to describe or name at least one musical notation placed on the at least one keyboard mockup or on the at least one markable and erasable piece of material.

The student and teacher may also use the music education system to compose music, by placing notes on the at least one markable and erasable piece of material and then pretending to play them or identifying them on the at least one keyboard mockup. The student or teacher may also play the notes placed on the at least one markable and erasable piece of material on an actual keyboard in order to hear what the composition sounds like. The student or teacher may also compose music by playing or identifying notes on the at least one keyboard mockup or on an actual keyboard and then placing at least one musical notation that describes the notes on the at least one markable and erasable piece of material in order to record the composition created on the keyboard.

When the student and teacher are done using the music education system, the at least one musical notation is removed 44 from the at least one markable and erasable piece of material, by either uncoupling the at least one musical notation or by erasing the at least one musical notation. The at least one markable and erasable piece of material is then removed 46 from the markerboard. The at least one markable and erasable piece of material and also the at least one keyboard mockup if desired is rolled 48 for storage. The at least one markable and erasable piece of material and the other components of the music education system are then placed in a storage container 50.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

Accordingly, any components of the present invention indicated in the drawings or herein are given as an example of possible components and not as a limitation.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The invention claimed is:

1. A Music Education System comprising:
   at least one staff, wherein the at least one staff is permanently coupled to at least one markable and erasable piece of material;
   wherein the at least one markable and erasable piece of material attracts magnetic surfaces in an area to which the at least one staff is coupled;
   wherein the at least one markable and erasable piece of material comprises at least one magnetic surface;
   wherein the at least one markable and erasable piece of material is removably coupleable to a markerboard with the at least one magnetic surface;
   at least one musical notation comprising at least one magnetic surface;
   wherein the at least one musical notation is removably coupleable to the at least one staff; and
   wherein the at least one markable and erasable piece of material can be rolled to allow the music education system to be stored compactly.

2. The music education system of claim 1, wherein at least one musical notation may also be drawn on the at least one staff.

3. The music education system of claim 1, further comprising at least one keyboard mockup.

4. The at least one keyboard mockup of claim 3, further comprising flexible material that allows the at least one keyboard mockup to be stored compactly.

5. The at least one keyboard mockup of claim 3, wherein the at least one keyboard mockup is markable and erasable.

6. The music education system of claim 1, wherein the music education system rolls for storage in a tube.

7. A Music Education System comprising:
   at least one staff permanently coupled to at least one markable and erasable piece of material;
   wherein the at least one markable and erasable piece of material comprises at least one magnetic surface;
   wherein the at least one markable and erasable piece of material is removably coupleable to a markerboard by the at least one magnetic surface;
   at least one musical notation placed on the at least one staff; and
   at least one keyboard mockup.

8. The music education system of claim 7, further comprising at least one musical notation comprising at least one magnetic surface by which the at least one musical notation couples to the at least one staff on the at least one markable and erasable piece of material.

9. The music education system of claim 7, wherein at least one of the at least one musical notation is a letter.

10. The music education system of claim 7, wherein the music education system rolls for compact storage.

11. The music education system of claim 7, wherein the at least one keyboard mockup is markable and erasable.

12. The music education system of claim 7, wherein the at least one keyboard mockup is formed from flexible material in order to allow the at least one keyboard mockup to be stored compactly.

13. A method for using a music education system comprising:
   coupling at least one markable and erasable piece of material to a markerboard, wherein at least one staff is permanently coupled to the at least one markable and erasable piece of material;
   placing at least one musical notation on the at least one staff;
   removing the at least one musical notation from the at least one staff;
   removing the at least one markable and erasable piece of material from the markerboard;
   rolling the at least one markable and erasable piece of material; and
   placing the at least one markable and erasable piece of material in a storage container.

14. The method of claim 12, further comprising placing at least one clef notation on the at least one permanent staff.

15. The method of claim 12, further comprising placing at least one keyboard mockup or at least one keyboard with at least one key in a location visible to at least one student.

16. The method of claim 15, further comprising asking the at least one student to locate the at least one key on the at least one keyboard mockup or on at least one keyboard that corresponds to the at least one musical notation placed on the at least one staff.

17. The method of claim 15, further comprising asking the at least one student to place at least one musical notation corresponding to at least one key marked on the at least one keyboard mockup or the at least one keyboard on the at least one staff.

18. The method of claim 15, further comprising asking the at least one student to identify at least one key on the at least one keyboard mockup or play at least one key on the at least one keyboard that corresponds to at least one musical notation placed on the at least one staff.

19. The method of claim 15, further comprising asking the at least one student to place at least one musical notation that corresponds to at least one key identified on the at least one keyboard mockup or played on the at least one keyboard on the at least one staff.

20. The method of claim 12, further comprising asking the at least one student to identify at least one musical notation placed on the at least one staff.

21. The method of claim 12, further comprising asking the at least one student to compose a musical composition on the at least one staff.

* * * * *